Dec. 29, 1936.  P. E. HAWKINSON  2,065,697

TIRE TREAD

Filed Feb. 20, 1936

INVENTOR
Paul E. Hawkinson
By his Attorneys
Merchant & Kilgore

Patented Dec. 29, 1936

2,065,697

UNITED STATES PATENT OFFICE 2,065,697

TIRE TREAD

Paul E. Hawkinson, Minneapolis, Minn.

Application February 20, 1936, Serial No. 64,908

1 Claim. (Cl. 152—14)

My invention relates to pneumatic tires and particularly to the treads thereof and has for its object to provide a tread that will run smoothly upon concrete and like road beds and which will have extremely high traction for running in snow, thereby making unnecessary the use of chains and like auxiliary traction tire attachments.

To the above ends, I provide a tire tread that has a continuous running surface broken only by pockets of novel construction and arrangement, which pockets, nevertheless, leave a continuous intervening tread surface.

Tire treads having deep transverse circumferentially alternated grooves, open at outer ends, have hitherto been made and used; but from such open grooves snow caught will escape and not form the most highly efficient nor compact snow ridges necessary for the best traction. I found that by providing the tread with pockets closed at sides and ends, so that the compressed snow can not escape therefrom, the tire in running through snow will press and leave on the road or line of travel very solid tooth-like ridges. In fact, in practice it has been found that the tooth-like ridges formed by the pockets will become so hard and firmly anchored that very considerable force is required to dislodge or loosen the same. The tire thus lays a toothed or sort of a racked-like track on which the tire tread runs much like the running of a gear in a toothed rack. Also, the pockets are so formed that they will clear themselves of the formed snow ribs formed thereby without distorting or breaking the same.

A preferred form of the tire is illustrated in the accompanying drawing wherein like characters indicate like parts throughout the several views.

Referring to the drawing.

Figure 1:
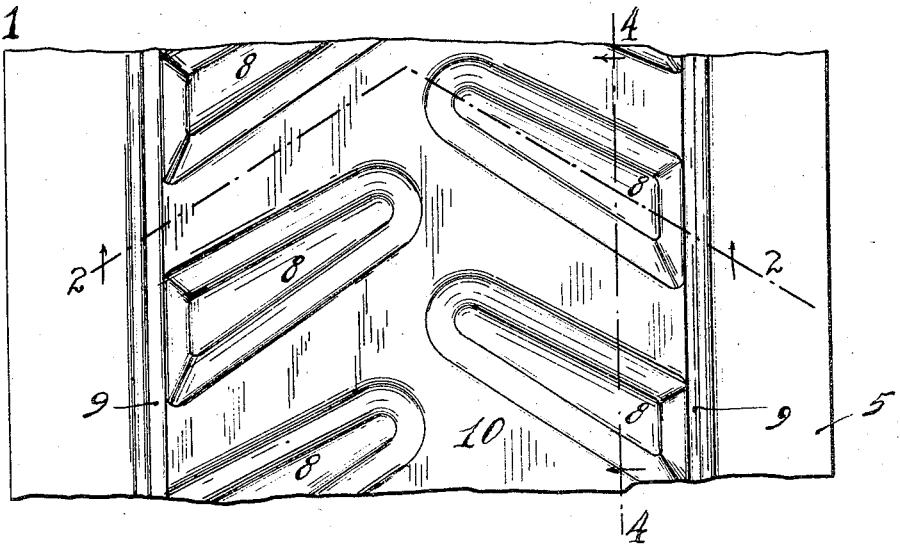
Fig. 1 is a fragmentary plan view looking at the face of the tread of a tire casing embodying the invention.
Figure 2:
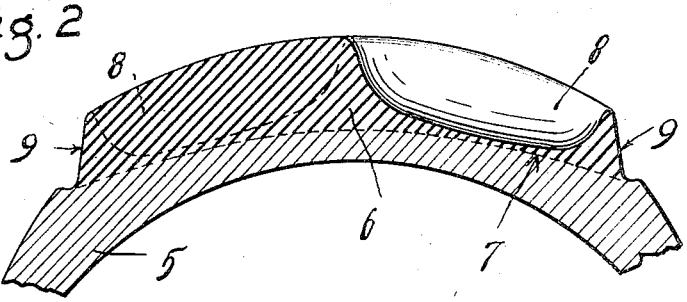
Fig. 2 is a section taken through an upper portion of the tire on the irregular line 2—2 of Fig. 1, some parts being broken away.

The tire casing proper is indicated by the numeral 5 and a retread, which has been vulcanized thereto, is indicated by the numeral 6. The substantially integral line on which the retread joins the tire casing is marked by dotted line 7. The retread is formed with pockets 8 and at its sides with outwardly projecting shoulders 9. These pockets 8, as above indicated, are closed at their sides and inner and outer ends. Said pockets are obliquely set so as to prevent skidding as well as to give driving traction, and they are preferably alternated or set zigzag circumferentially but are spaced apart so as to leave smooth continuous tread surface 10 that is not completely broken at any place and is continuous between the pockets, thereby giving a smooth running surface for travel on concrete or other smooth road beds.

The pockets may be formed in any new tires or in the retreads of retreaded tires and in the latter instance, the pockets will be formed entirely within the retread. As will be noted, the side and end closing walls of the pockets flare outward so that they catch the snow and compress the same into the ridges, but will clear the formed snow ridges under movement of the tire. This clearing action is important because it prevents distorting or breaking loose of the snow ridges after they have once been compressed and formed and securely anchored to the road bed.

In actual practice, tire retreads formed with the pockets designed as described have been found to be very highly efficient and, in fact, to give better traction to the tire than can be obtained by tread chains or like auxiliary attachments. The tread chains are not only expensive and wear rapidly, especially on concrete roads, but are objectionable because of the noise and jolting and jarring actions and the trouble in applying and removing the same. This improved tire tread has all of the advantages of the tire chain without any of the disadvantages or objections thereto. Moreover, this tire tread is no more expensive to apply than any other tire tread involving the same amount and grade of rubber. In fact, it is a good and satisfactory tire for the smooth roads and a most highly desirable tire for travelling through snow.

Figure 3:
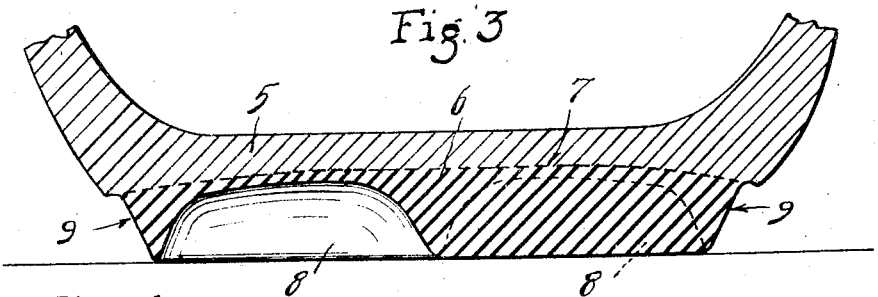
Fig. 3 is a transverse section, with some parts broken away, taken through the road-engaging portion of the tire and showing the flattened condition thereof at the point of road contact.
Figure 4:
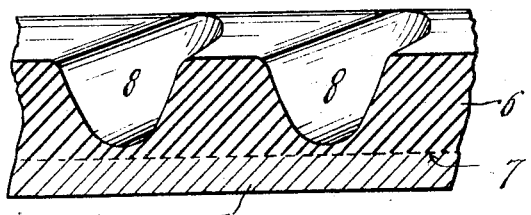
Fig. 4 is a fragmentary section taken on the line 4—4 of Fig. 1.

As a further improvement in the construction and operation of the tread, the tread rubber is cured circumferentially "short" and in flattened condition substantially as shown in Fig. 3. Whether the tire be new, in which instance the original tread is to be applied, or whether the tire be a worn one, in which case a retread is to be applied, the tread rubber when cured "short" must be applied after the body of the casing has been formed and cured. In practice it has been found that when the retread rubber is applied full length, while the tire casing is in normal form, or that is, inflated, there will be produced, when the rolling tire is under load, a forward flow of rubber just ahead of that portion which contacts the road. This is usually designated as a "tread wave" and produces increased heat and friction in the rubber and tends to impede the forward movement of the tire.

The just above noted effects may be overcome and the improvement in the action of the tread or retread improved by applying and curing the tread rubber "short". Broadly, this curing of the tread rubber "short" is disclosed and broadly claimed in my prior patents Nos. 1,917,261 and 1,917,262 of date July 11, 1933. As disclosed in my said prior patents the tire casing can be circumferentially contracted by spreading the casing laterally; and the application of the rubber "short" under normal stress may be accomplished by applying and vulcanizing the tread rubber under normal stress while the casing is thus contracted and laterally spread so that the tread rubber transversely is cured flat or in the condition to which it will be subjected by road contact under load. With the rubber cured "short" the tread wave is avoided and the friction and generation of heat, hitherto produced by "tread waves" is eliminated.

The tread rubber cured "short" has a special relation to or action upon the closed pockets of this improved tire. When the tire is at full diameter, the tread rubber, which has been cured "short", will be stretched and the pockets will be relatively wide spread. When the tread rubber, under load, is pressed and flattened upon the road, there will be a slight contraction of the pockets at the very time that they are compressing the snow, for example, into the tooth-like ridges. As the tread rubber leaves the formed ridges, it will assume a stretched condition which tends to spread or expand the pockets and thus greatly assist in releasing the hard compressed ridges anchored to the road-bed. In a tire constructed as just above discussed, the curing radius and the "loaded rolling radius" will be substantially the same.

What I claim is:

A tire casing having a rubber tread surface terminating in abrupt side shoulders on the tread surface of the casing, said tread having obliquely disposed pockets in staggered arrangement, the inner extremities of said pockets terminating approximately at the medial plane of the casing, and the outer ends of said pockets terminating in walls extended approximately to and parallel with said side shoulders, the tread face of the tire having a continuous tread surface between the said pockets, and the walls of said pockets being oblique so that they are self-clearing of compressed snow.

PAUL E. HAWKINSON.